A. MORRISON.
RAIL SPLICE.
APPLICATION FILED NOV. 26, 1909.
1,008,427.
Patented Nov. 14, 1911.
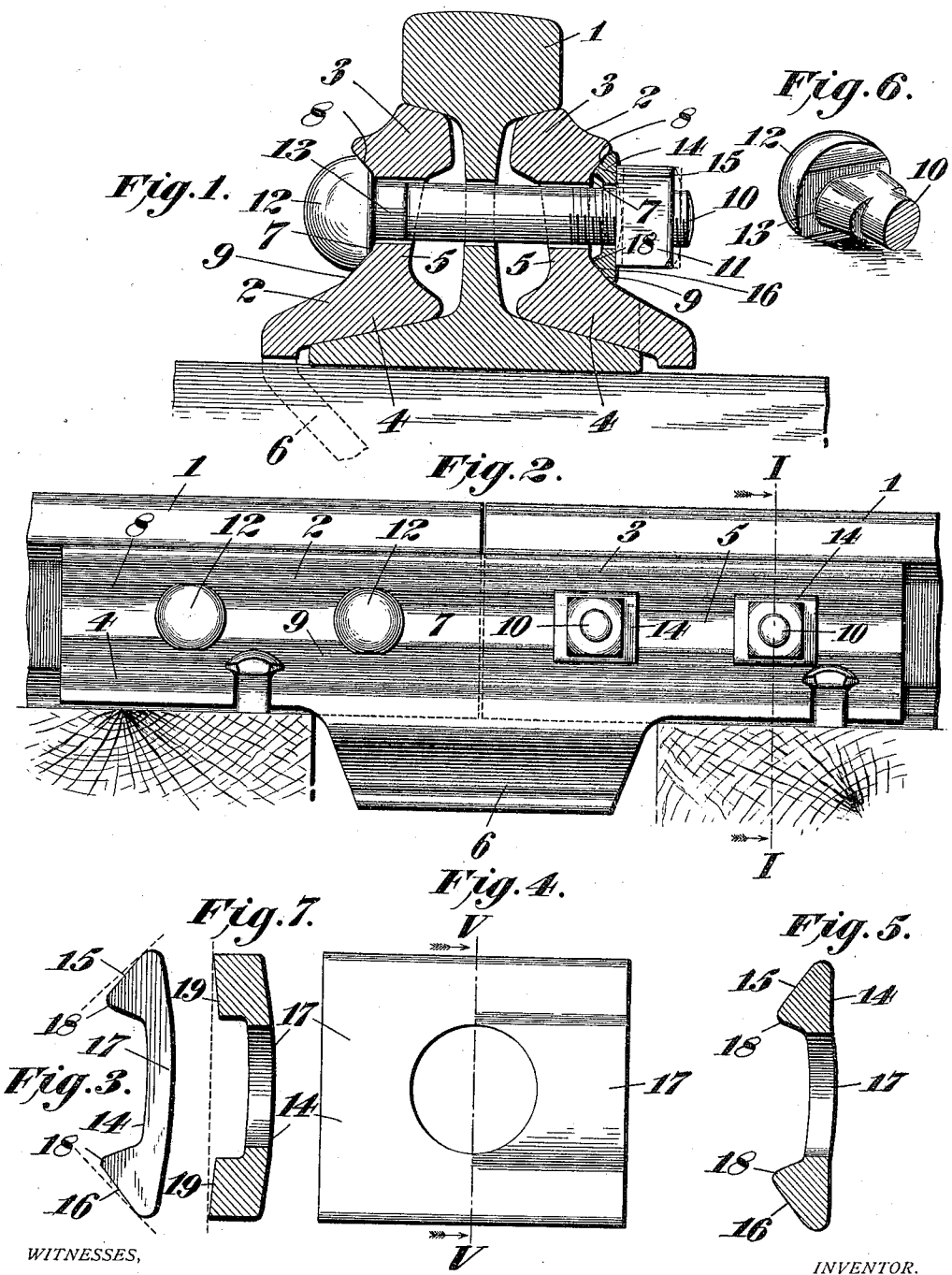
WITNESSES,
Elmer Seavey
Wm. J. Fitzmaurice, Jr.
INVENTOR.
Andrew Morrison
by Geo. E. Thackray
his ATTORNEY.

UNITED STATES PATENT OFFICE.

ANDREW MORRISON, OF PITTSBURGH, PENNSYLVANIA, ASSIGNOR TO CAMBRIA STEEL COMPANY, A CORPORATION OF PENNSYLVANIA.

RAIL-SPLICE.

1,008,427.  Specification of Letters Patent.  Patented Nov. 14, 1911.

Application filed November 26, 1909. Serial No. 529,862.

*To all whom it may concern:*

Be it known that I, ANDREW MORRISON, a citizen of the United States, residing at Pittsburgh, in the county of Allegheny and State of Pennsylvania, have invented certain new and useful Improvements in Rail-Splices; and I do hereby declare the following to be a full, clear, and exact description of the invention, such as will enable others skilled in the art to which it appertains to make and use the same.

My invention relates to splices for railway rails and particularly to fastening means for the same. Its principal object is to provide a spring washer which may be used between the splice-bar and the nut on the splice-bolt, forming a bearing for the nut and also serving as a nut-lock.

Other objects will appear hereinafter.

Many splice-bars, while of forms to meet the requirements of their uses, have exterior surfaces of such shapes that an ordinary track-bolt or nut will not bear on the same in an efficient manner. This is particularly true of bars which, by reason of reinforcing fillets and ridges, have an external longitudinal groove formed in line with the bolt holes. On account of the limited depth of the splice-bar, it frequently happens that the groove thus formed is not large enough to permit the turning of the nuts. Attempts have been made to overcome this defect by counter-boring the surface of the splice-bar around the bolt holes, but such methods are expensive and often excessively reduce the cross-sectional area of the bar. I enable a flat-faced nut to be used with such a splice-bar by interposing a washer of peculiar shape between the splice-bar and the nut. The washer is preferably of spring steel and will fit within the groove in the splice-bar, contacting with the same along its upper and lower edges, the middle portion of the washer being arched outwardly. It is of such a form that it may be manufactured by rolling and subsequently cutting to the desired length. When the washer is placed in position and the nut tightened, the arched middle portion, by reason of its resiliency, deflects enough to provide a flat bearing for the nut and at the same time exerts an outward force tending to lock the nut in position.

My washers have smooth exterior surfaces which permit them to be made in a rolling mill in the form of long bars, and then cut to short lengths as required, and the smooth surfaces also provide proper and substantial bearings for the nut thereon. Such a washer permits the nut to be easily removed by means of a wrench, but prevents the loosening of the nut by vibration.

In some cases I may find it desirable to use a washer between the head of the bolt and the groove of the splice-bar, but usually the head may be easily formed to bear on the bar without the aid of a washer.

Although my spring washer is adapted for use in connection with the form of splice-bars hereinbefore referred to, my invention includes generically, the form of spring-washer which is comparatively thin and arched at its center, and having thickened edges projecting from the thinner portion, said thickened edges either having bearing surfaces inclined to the general surface of the washer, or having bearing surfaces substantially parallel or nearly parallel thereto, this latter form being for use in connection with splice-bars, the bearing surfaces of which are flat or approximately so.

In the sheet of drawings accompanying this specification, in which like characters of reference indicate like parts throughout the views:—Figure 1 is a cross section taken on the line I—I of Fig. 2, looking in the direction of the arrows, the bolt and nut being shown in elevation. The position and shape of the washer before the tightening of the nut is indicated in dotted lines. The left hand side of this view also shows, in dotted lines, the general inclination of the downwardly depending member more clearly shown in Fig. 2. Fig. 2 is a side elevation of a rail splice formed in accordance with my invention. Fig. 3 is an end elevation of one of my improved washers. In this figure the dotted lines at the top and bottom indicate the sides of the groove in the splice-bar, from which it may be seen that, when the washer is first placed in position, only its edges touch the surface of the bar. The tightening of the nut causes the washer to bend so that its lateral bearing surfaces substantially fit and contact with the groove in the splice-bar. Fig. 4 shows, on the left of the center line, a front elevation of the washer shown in Fig. 3, and, on the right, a front elevation of another form shown more clearly in Fig. 5. Fig. 5 is a cross section taken on the line V—V of Fig. 4 and shows another form of my spring washer. Fig. 6 is a perspective view of the head and neck of the bolt in Fig. 1. Fig. 7 is a cross section of the form of my washer suitable for use upon flat surfaces. The dotted line in this figure indicates the surface against which the washer is adapted to be used, and against which the ribs or projections will bear when the nut is screwed down.

Referring now to the drawings in detail, the abutting ends of the rails 1 are shown as being joined and supported by the splice-bars 2. Each of the splice-bars consists of a thickened portion 3 extending along the top and adapted to contact with the under surface of the rail head, a downwardly inclined portion 4 adapted to contact with the upper surface of the rail flange, a web 5 joining the portions 3 and 4, and a centrally located member 6 which extends downwardly and inwardly from the outer edge of the member 4. The member 6 may sometimes be omitted, in which case the right hand side of Fig. 1 would represent the general cross section of the splice-bar. The outer surface 7 of the web 5 is joined to the surfaces of the portions 3 and 4 of the splice-bar by the substantially plane, outwardly diverging surfaces 8 and 9 respectively. The splice-bars are held in place by the bolts 10 and nuts 11. The bolt is shown in Figs. 1 and 6 as having a head 12, the bearing surface of which is shaped to fit the groove formed by the surfaces 7, 8 and 9. The neck 13 of the bolt is of oval shape and furnishes additional security against turning. The washers 14 are interposed between the nut and the splice-bar and fit within the groove in the bar. They are preferably rectangular, but not necessarily so. When in position, the nut on the splice-bolt being tightened, the surfaces 15 and 16 of the washer contact respectively with the surfaces 8 and 9 of the splice-bar. Under certain conditions this contact of the inclined surfaces 15 and 16 of the washer coöperates with the adjoining surfaces 8 and 9 of the groove in the splice bar, whereby these latter serve as frictional abutments for the arched spring washer thereby adding to the resiliency thereof. The middle portion 17 of the washer is preferably somewhat thinner than near the edges and is normally arched outwardly as shown in Figs. 3 and 5. The ribs 18 extend along the upper and lower edges of the washer and as shown in the figures just mentioned, are of substantially triangular cross section. Fig. 1 shows the washer as it appears after the nut 11 has been tightened, the arched portion 17 having been flattened until its outer surface is substantially plane. The resiliency of the washer causes it to press outwardly against the nut, thus tending to prevent the latter from becoming loose. In this respect it serves as a nut-lock.

The form of washer shown in Fig. 7 is provided with bearing surfaces 19 which are adapted for use on a splice-bar having a flat surface surrounding the bolt holes.

The ends of a washer formed in the manner described herein can move outwardly enough to permit the arched middle portion to flatten without buckling.

When I use a washer of the forms shown by Figs. 3 and 5 in connection with a suitable groove in the splice-bar, there is a wedging action on the splice-bar which coacts more with the frictional forces to restrain the outward movement of the ends of the washer. Consequently this form has an increased outward thrust against the nut.

It will thus be seen that I have provided a rail splice in which both the bolt and the nut are prevented from turning and each has a good bearing, which features are highly essential in such a device.

Although I have shown and described my improvements in considerable detail, I do not wish to be limited to the exact and specific details shown and described, but may use such substitutions, modifications or equivalents thereof as are embraced within the scope of my invention as pointed out in the claims.

Having thus described my invention, what I claim and desire to secure by Letters Patent is:

1. In a rail-splice, a splice-bar having an external longitudinal groove, a bolt passing through said splice-bar a spring washer provided with integral thickened ribs on opposite edges, said ribs being formed to fit and contact with the edges of the groove, the middle portion of said washer being out of contact with the splice-bar, and a nut mounted on said bolt and contacting with the outer surface of said washer.

2. In a rail-splice, a splice-bar having an external longitudinal groove, a bolt passing through said splice-bar, a spring washer having lateral projecting thickened ribs adapted to fit and contact with the edges of the groove, the middle portion of said washer being out of contact with the splice-bar, and a nut mounted on said bolt and contacting with the outer surface of said washer.

3. In a rail-splice, a splice-bar having an external longitudinal groove, a bolt passing through said splice-bar, a washer provided with thickened ribs on opposite edges adapted to fit and contact with the edges of the groove, the middle portion of said washer being arched outwardly out of contact with the splice-bar, and a nut mounted on said bolt and contacting with the outer surface of said washer.

4. In a rail-splice, a splice-bar having an external longitudinal groove, a bolt passing through said splice-bar, a rectangular washer having lateral projecting thickened ribs adapted to contact with the edges of the groove, the middle portion of said washer being arched outwardly out of contact with the splice-bar, and a nut mounted on said bolt and contacting with the outer surface of said washer.

5. In a rail-splice, a splice-bar having an external longitudinal groove, a bolt passing through said splice-bar, a spring washer provided with integral thickened ribs on opposite edges adapted to fit and contact with the edges of the groove, the middle portion of said washer being comparatively thin and out of contact with the splice-bar, and a nut mounted on said bolt and contacting with the outer surface of said washer.

6. In a rail-splice, a splice-bar having an external longitudinal groove, a bolt passing through said splice-bar, a washer provided with integral thickened ribs on its opposite edges adapted to fit and contact with the edges of the groove, the middle portion of said washer being comparatively thin and arched outwardly out of contact with the splice-bar, and a nut mounted on said bolt and contacting with the outer surface of said washer.

7. In a rail-splice, a splice-bar having an external longitudinal groove, the lateral surfaces of said groove being outwardly diverging planes, a spring washer adapted to fit and contact with said lateral surfaces, the middle portion of the washer being out of contact with the splice-bar, a bolt passing through the splice-bar and the washer, and a nut mounted on said bolt and contacting with the outer surface of the washer.

8. In a rail-splice, a splice-bar having an external longitudinal groove, the lateral surfaces of said groove being outwardly diverging planes, a washer adapted to fit and contact with said lateral surfaces, a bolt passing through the splice-bar and the washer, and a nut mounted on said bolt and contacting with the outer surface of the washer, the middle portion of said washer being arched outwardly when the nut is loose.

9. As an article of manufacture, a spring washer symmetrical in cross-section having a rib extending along each of two parallel edges, the middle portion of the washer, between the ribs being arched, thinner than said ribs and having a smooth exterior nut bearing surface.

10. As an article of manufacture, a spring washer symmetrical in cross-section having two substantially parallel ribs projecting from the surface of the same, the portion of the washer between the ribs being arched, thinner than said ribs and having a smooth exterior nut bearing surface.

11. As an article of manufacture, a spring washer symmetrical in cross-section having lateral surfaces which are mutually diverging planes, the middle portion of the washer being thinner than the portions near the edges, said middle portion being arranged in the form of an arch.

In testimony whereof I hereto affix my signature in the presence of two witnesses.

ANDREW MORRISON.

Witnesses:
ELMER SEAVEY,
WM. J. FITZMAURICE, Jr.

---

Copies of this patent may be obtained for five cents each, by addressing the "Commissioner of Patents, Washington, D. C."